United States Patent [19]
Mabey et al.

[11] Patent Number: 5,278,831
[45] Date of Patent: Jan. 11, 1994

[54] INFORMATION TRANSMISSION SYSTEM

[75] Inventors: Peter J. Mabey; Diana M. Ball, Comberton, both of England

[73] Assignee: U.S. Philips Corporation, New York, N.Y.

[21] Appl. No.: 909,897

[22] Filed: Jul. 7, 1992

[30] Foreign Application Priority Data

Jul. 9, 1991 [GB] United Kingdom ............... 9114808

[51] Int. Cl.$^5$ .......................................... H04B 7/212
[52] U.S. Cl. .................................. 370/94.1; 370/95.1; 455/38.3; 455/343
[58] Field of Search ................ 370/92, 93, 94.1, 95.1, 370/105.1; 455/38.1, 38.2, 38.3, 228, 343

[56] References Cited

U.S. PATENT DOCUMENTS 4,961,073 10/1990 Drapac et al. .................. 455/38.3
5,030,948 7/1991 Rush ................................ 455/38.2

*Primary Examiner*—Benedict V. Safourek
*Attorney, Agent, or Firm*—David R. Treacy

[57] ABSTRACT

An information transmission system comprises a primary station and a number of secondary stations, information being transmitted from the primary station during traffic time periods which are interspersed in time with control time slots. The control time slots contain control data (CD) which contains a number of identifying indications (CMD1,CMD2,CMD3,CMD4) which each may include an address relating to a secondary station for which succeeding traffic information is intended. The identifying indications may be configured in a number of different ways, for example (E1), it may contain an address (A) and a traffic position identifier (XN). It may also contain, for example (E2), a channel identifier (CH). The information in the control slots allows secondary stations, which may be powered down for substantial periods of time, to prepare for reception of succeeding information if an address identifying that secondary station is included in the control data (CD).

16 Claims, 2 Drawing Sheets

INFORMATION TRANSMISSION SYSTEM

BACKGROUND OF THE INVENTION

The present invention relates to an information transmission system having particular, but not exclusive, application to a multiple user radio system comprising a primary station and a number of secondary stations. The present invention also relates to a primary station and secondary station for use with such a system, and to a method of transmitting information in a multiple user system.

Information transmission systems, for example radio systems, comprising a primary station and a number of secondary stations are often not required to carry information between the primary station and all of the secondary stations for all of the time that the system is operational. Individual secondary stations may only be sending or receiving information for a small proportion of the time. In such situations it is common to want to reduce the amount of attention which the secondary stations pay to the transmissions of the primary station, for example so that a portable radio receiver may reduce power consumption and hence extend battery life.

It is an aim of the present invention to provide a system for, and a method of the transmission of information.

SUMMARY OF THE INVENTION

According to a first aspect of the present invention there is provided an information transmission system comprising at least one primary station and a plurality of secondary stations, the primary station comprising means for transmitting traffic information in packets during traffic time periods and means for transmitting control information during control time slots interspersed amongst the traffic time periods, the secondary stations comprising means for receiving information transmitted by the primary station, characterised in that the means for transmitting control information is arranged to transmit an indication for identifying each secondary station for which succeeding traffic information is intended, and in that at least one secondary station further comprises means to energise the receiving means during the control slots and means responsive to the reception of an indication identifying that secondary station to energise receiving means during at least part of a following traffic time period.

The traffic time period may be subdivided into a number of shorter traffic time slots which may be of equal duration. In one embodiment of the invention, the period is divided into four equal traffic time slots each slot carrying overhead and traffic data. Alternatively, a larger number of traffic time slots, for example 16, may be provided which may be used together in groups with overhead carried only once per group.

The control slot may be arranged to contain the identification indications relevant to the secondary stations one after the other and the position in which the indication is transmitted within the control period may, when a period is divided into slots, be used to identify at what point in time information intended for the particular secondary station identified will be sent. As an alternative the control slot may contain an explicit indication of the point in time at which the information intended for each of the secondary stations identified will be sent. More simply, no position indication needs to be sent and secondary stations will energise receiving means immediately to receive the information intended for that station when it occurs within the traffic time period. The identification indication may be arranged to identify a set of secondary stations arranged as a group, in other words a number of secondary stations for which the same information is intended can be instructed to energise receiving means at the same time.

A second aspect of the present invention relates to a method of transmitting information from a primary station to a plurality of secondary stations, said method comprising transmitting traffic information in packets during traffic time periods, transmitting control information during control time slots interspersed amongst the traffic time periods, and receiving at least a portion of the transmitted information at the secondary stations, characterised in that the control information includes an indication for identifying each secondary station for which succeeding traffic information is intended, and in that in response to the reception of an indication for identifying that secondary station, the secondary station is energised to receive the succeeding traffic information.

According to a third aspect of the present invention, there is provided a primary station for use in an information transmission system which further comprises a plurality of secondary stations, the primary station comprising means for transmitting traffic information in packets during traffic time periods and means for transmitting control information during control time slots interspersed amongst the traffic time periods, characterised in that the means for transmitting control information is arranged to transmit in a control slot an indication for identifying each secondary station for which succeeding traffic information is intended.

According to a fourth aspect of the invention there is provided a secondary station for use with an information transmission system in accordance with the first aspect of the invention, the secondary station comprising means for receiving information transmitted by the primary station, characterised in that the secondary station further comprises means to energise the receiving means during the control time slots and means responsive to the reception of an indication identifying that secondary station for energising the receiving means during at least part of a following traffic time period.

Where an indication from a primary station may relate to a group of secondary stations, each secondary station in the group would be arranged to energise receiving means in response to such an indication. The secondary stations will also respond to their own address, a unique indication which is specific to each of them.

The present invention will be described, by way of example, with reference to the accompanying drawings.

DESCRIPTION OF THE PREFERRED EMBODIMENT

Figure 1:
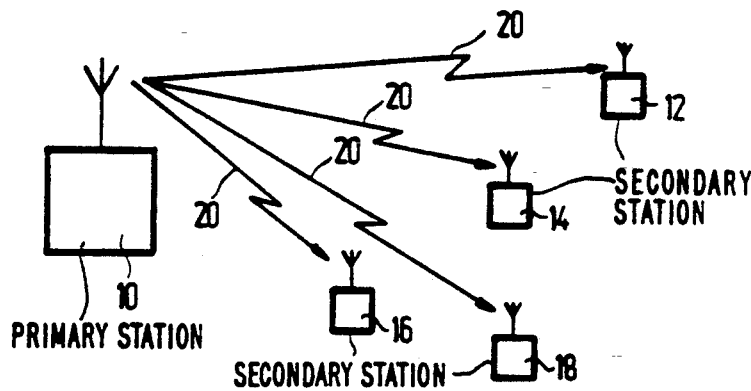
FIG. 1 shows a primary station and a number of secondary stations which may receive transmissions from the primary station.

FIG. 1 shows an illustrative radio system comprising a primary station 10 and four secondary stations 12,14,16,18. A radio signal transmitted by the primary station 10 travels over a number of paths 20 to the secondary stations. Return paths for the transmission of information from the secondary stations to the primary station will generally also exist but are not shown in the Figure in the interests of clarity. The primary station transmits information in a disciplined manner in which system control signals are alternated with information or traffic signals.

Figure 2:
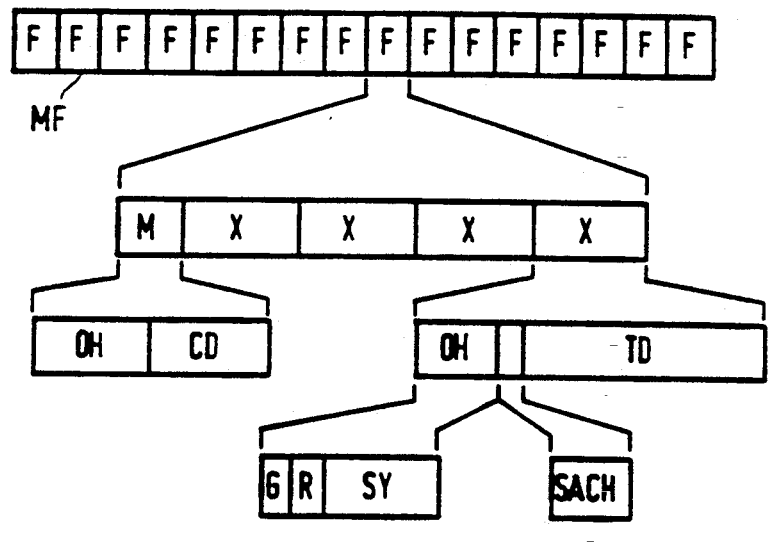
FIG. 2 shows a diagram of a configuration of the signals transmitted by the primary station.

FIG. 2 shows one configuration for a channel structure. One multi-frame MF comprises sixteen frames F as shown at the top of the figure. Below this is shown the layout of an individual frame F which, in this example, comprises 2640 bits and is divided into a Minimum Control Channel (MCCH) slot of 240 bits and a group of four information channel (XCCH) slots of 600 bits each. The MCCH slot M comprises 120 bits of overhead OH and 120 bits of control data CD. The XCCH slots may be each used as speech channels, data channels or as one or more extended control channels. Each XCCH slot X comprises 120 bits of overhead OH, a 24 bit slow associated control channel slot SACH and 456 bits of traffic data TD. The XCCH slot overhead comprises an 8 bit guard slot G, a 40 bit ramp slot R and a 72 bit synchronising slot SY. The ramp slot R is provided to allow secondary stations to build up transmitter power when communicating on the radio link (or uplink) to the primary station. Since the primary station does not need the ramp slot for this purpose, the radio link (or downlink) between primary and those secondary stations which are currently only receiving may contain system information in the ramp slot. In the example shown the XCCH slots may comprise two extended control channels if more control signals than can be accommodated in a MCCH slot are required.

While the channel structure shown in FIG. 2 divides the traffic time period into 4 equal length slots, it will be appreciated that a variety of alternative arrangements are possible. No specific slots need to be defined and the slot length may be determined by the amount of information to be transmitted to one or more users. Alternatively shorter slots which may be grouped together with one overhead per group may be used. Such an arrangement allows greater flexibility in data packet size while still permitting the locations of specific data to be identified.

Figure 3:
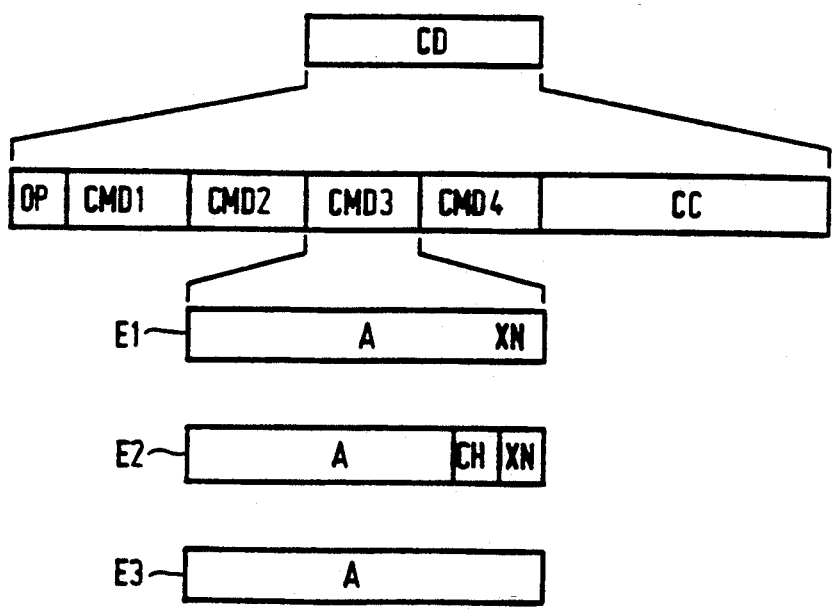
FIG. 3 shows a configuration of the control slot of the signals transmitted by the primary station.

FIG. 3 shows the structure of the control data slot CD which comprises the second half of the MCCH slot M in the channel structure of FIG. 2. The control data slot is 120 bits long and is subdivided as follows. The first eight bits, labelled OP, are an operation code defining the function of the message contained in the control slot. In the present example this operation code would identify that the control slot contains the addresses of one or more of the secondary stations in the system. The operation code may, as an alternative, identify an acknowledgement signal (for example in response to a registration request), requests for secondary stations to send information and so on. The next 18 bits comprise an identifying indication, labelled CMD1, which includes the address of a first secondary station indicating that succeeding information is destined for it; these 18 bits are sometimes referred to as a 'wake-up' command. The following 54 bits similarly comprise three other wake-up commands, each of 18 bits and labelled CMD2, CMD3 and CMD4 respectively; each of these includes an address identifying the relevant secondary station. The final 40 bits of the control data slot contain channel coding CC to provide error detection and correction facilities in known manner. This channel coding may be distributed throughout the control slot rather than located together at the end as shown here.

The identifying indications CMD1...CMD4 may be constructed in a number of different ways. For example, as shown at E1 in the figure, CMD3 comprises a 16 bit address which identifies the secondary station for which subsequent information is destined and is followed by a two bit slot number XN. This slot number identifies which of the following four XCCH slots (FIG. 2) contains information intended for the particular secondary station (or stations) identified by the address. Information for a particular secondary station may extend into following slots, even beyond the next MCCH slot. The information for a particular secondary station may be transmitted during one XCCH slot per frame F, for example during the same XCCH slot in a number of succeeding frames. Such a technique may be particularly applicable if digitised speech signals are also being transmitted on the same channel in another XCCH slot during the same succeeding frames. The overhead OH in the XCCH slots (FIG. 2) may be used to identify to a particular secondary station where the next XCCH slot containing information intended for that secondary station is to be found. As an alternative the secondary station may receive until an end of transmission (EOT) signal is received by it.

The information transmission system may comprise a number of different channels on different frequencies over which information may be transmitted and it will often be convenient to alert a secondary station to succeeding information which is destined for it but which is to be transmitted on a different channel. In this case, as indicated at E2 on the Figure, a channel identification CH is also included in the 18 bit indication. In the illustrative system there are four channels so the CH is 2 bits long. In order to constrain the total length of the indication to 18 bits, the address is only 14 bits long in this case. The OP code and the channel coding may be arranged in the same manner whichever structure is used for the identifying indications. If the channels of the system are not synchronised then a channel identification may still be transmitted to a secondary station which will have to synchronise to a new channel when the channel has been changed before information may be received by it. Accordingly an earlier warning of succeeding information intended for a secondary station will probably be required.

At E3 an alternative layout for the identifying indication (such as CMD3) is shown. The indication contains a 18 bit address and thus it contains no XN signal. The channel change signal CH has been omitted because the system only has one channel. When no XN signal is used and the traffic time period is divided into slots, the secondary stations within the system may identify in which of the following time slots to start receiving from the position of the indication identifying it in the control data slot. For example, if the information intended for a particular secondary station is to be transmitted in a first XCCH slot then the indication containing that secondary station's address would be located at position CMD1. If, for example, the information for a particular secondary station is to be transmitted in the third XCCH block then the address for that secondary station would be included in the indication CMD3. Alternatives to this straightforward correlation between the position of the indication and the subsequent information are, of course, possible. For example, an indication in the first position (CMD 1) could identify information due in the final XCCH slot and so on, provided that the primary station and the secondary stations are consistent with each other in their operation.

The identifying indications CMD1 ... CMD4 or 'wake-up' signals, in the interests of system efficiency, need not be acknowledged. The main information may be acknowledged in a number of known ways, for example in the manner described in European Patent number 0 213 682B. The indications CMD1 ... CMD4 may each apply to more than one individual secondary station by grouping of secondary stations in known manner.

Figure 4:
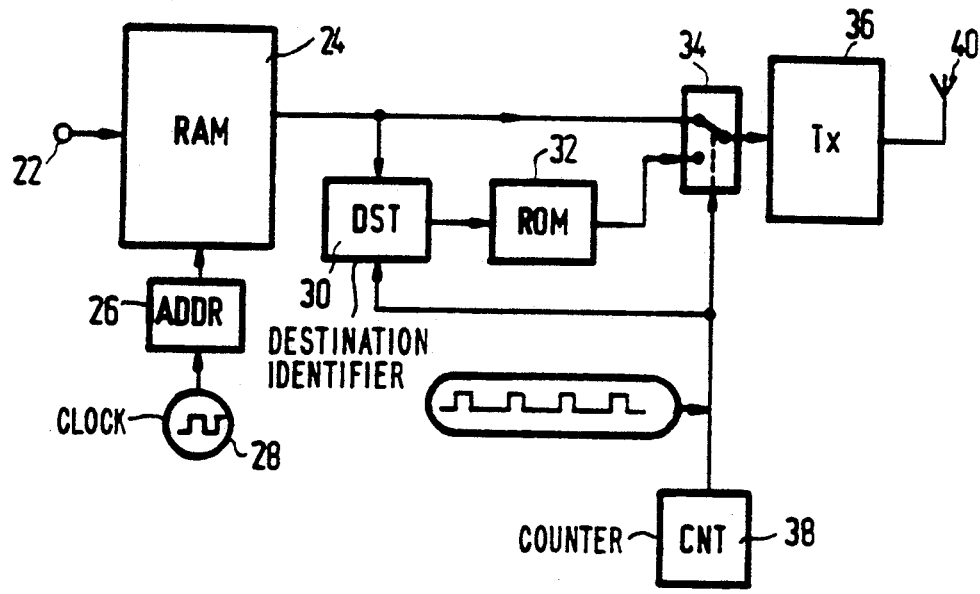
FIG. 4 shows a block diagram of a transmission arrangement for use in a primary station in accordance with the system.

FIG. 4 shows a block schematic diagram of a transmission arrangement for use in a primary station in accordance with the present invention. An information input 22 is connected to an input to a storage device (RAM) 24. The RAM 24 is addressed by an addressing device (ADDR) 26 which is itself driven by a clock oscillator 28. It will be clear to those or ordinary skill in the art that, for reading out stored information and destination information, the addressing device or microprocessor 26 and its clock 28 are synchronized to the transmission bit rate. An output from the storage device 24 is coupled to a first input of a switch 34 and to a first input of a destination identifier (DST) 30. The DST 30 has an output which is coupled to address an optional read only memory (ROM) or look-up table 32 whose data output is coupled to a second input of the switch 34. A counter (CNT) 38 is arranged to produce a square wave with a mark to space ratio corresponding to the ratio between the times required by control slots and traffic time periods in the information transmissions. It will similarly be clear to those or ordinary skill in the art that the counter 38 is synchronized to the transmission bit rate; as described with respect to FIGS. 2 and 3, then, a mark has a duration of 240 bits and a space has a duration of 2400 bits. The simplest implementation of this function is to have the counter 38 count clock pulses from a transmission bit rate clock. An output from the counter 38 is coupled to a second input to the destination identifier 30 and to a control input of the switch 34. The switch 34 has an output which is connected internally either to the first input or to the second input depending upon the state of the control input. The output of the switch 34 is coupled to a transmitter 36 which in turn is coupled to an antenna 40.

In operation, information and the intended destination(s) for it are contained in the RAM 24 which is updated via the input 22. The information and its intended destinations are read out at an appropriate rate by the addressing device 26 which may comprise a microprocessor. It is assumed in this example that the RAM 24 also contains the respective overhead for inclusion in the MCCH slot and the XCCH slots. This overhead may be included in the signal to be transmitted at some other stage if desired. The destination identifier 30 is coupled to receive an output from the RAM 24 and the operation of the identifier 30 is controlled to operate by the CNT 38. The CNT 38 produces a signal which is in a first state (high) during the MCCH slot and in a second state (low) during the four XCCH slots. When the signal from the counter is in the first state the DST 30 is activated and it searches the output of the RAM 24 for up to four identifier signals. Channel change information may also be searched for. The DST 30 then arranges the address and channel information in the correct order, as described with reference to FIG. 3, and passes a signal to address the ROM 32. The ROM 32 is optional and may be included if further coding of the control signal is required whereby the addresses within the ROM are arranged to contain the coded version of their respective address values. While the output of the CNT 38 is still in the first state the output of the ROM 32 is coupled via the switch 34 to the transmitter (Tx) 36 which transmits the control information in a known manner, for example by phase shift keying.

When the destination and channel change information has been sent to the Tx 36, together with the other contents of the MCCH slot, the output from the CNT 38 assumes its second state (low), the DST 30 is deactivated and the switch 34 is arranged to connect its first input to its output. Information from the RAM 24 is then fed directly to the Tx 36 which transmits the main information in the predetermined XCCH slots after the control information. When the main information has been transmitted, the output of the CNT 38 assumes its first state again and the process is repeated. The Tx 36 and antenna 40 may be replaced by a means of transmitting information via fixed paths such as a landline or optical link.

Figure 5:
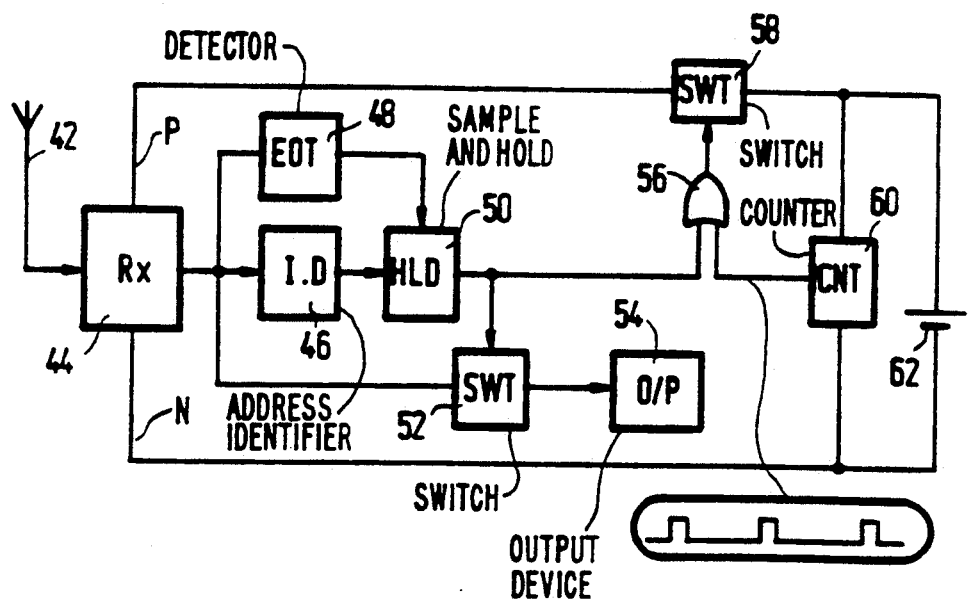
FIG. 5 shows a block diagram of a secondary station for use in the system.

FIG. 5 shows a block schematic diagram of a receiving arrangement for a secondary station in accordance with the present invention. An antenna 42 is coupled to an input of a receiver (Rx) 44 which receiver has a positive supply line P and a negative supply line N. An output of the receiver is coupled to an identifying means (ID) 46, to a first input of a switch (SWT) 52 and to an input of end-of-transmission detector (EOT) 48. The ID 46 has an output which is in a first state when the address for the secondary station (or an address for a group of which the secondary station is a member) is detected at the output of the receiver and is in a second state otherwise. The output from the ID 46 is coupled to a sample and hold device (HLD) 50 having an output which assumes a first state in response to an input from the ID 46 and which assumes a second state in response to a reset signal from the EOT 48 at a second input. The second input is coupled to an output of the EOT 48. The output of the sample and hold device 50 is coupled to a control input of a switch (SWT) 52 and to a first input of an OR gate 56. An output of the switch 52 is coupled to an information output device (O/P) 54, for example a display, a printer and/or a storage means. A second input to the OR gate 56 is coupled to an output of a counter (CNT) 60 which produces an output signal identical to that of the CNT 38 depicted in FIG. 4. The CNT 60 is coupled directly to a power source 62 such as a battery. As described above with respect to counter 38, it is clear that the counter 60 will be synchronized to the transmission bit rate, and in fact will be synchronized on a frame basis to the signals being received by the receiver 44. The simplest implementation of this function is to have the counter 60 count clock pulses from a bit rate clock synchronized to the output of the receiver 44. The positive terminal of the power source is also connected to an input of a switch (SWT) 58. A control input to the switch 58 is coupled to the output of the OR gate 56. An output from the switch 58 is coupled to the positive supply line P to the Rx 44. The switch 58 connects its input to its output in response to an active signal at the control input. The negative terminal of the power source is connected directly to the negative supply line N of the Rx 44. The remaining circuitry (except for the OR gate 56 and the switch 58) can be connected directly to the power source 62 or to the switched power lines P,N as desired.

In operation the CNT 60 produces a waveform which activates the OR gate 56, the switch 58 and hence the Rx 44 periodically to receive the control information transmitted during the MCCH slot by the transmitter 36 (FIG. 4). The output of the receiver is searched by the ID 46 for the address relating to the particular secondary station. If its address is detected, the output of the ID 46 assumes its first state and the HLD 50 latches on to provide a signal in this first state to SWT 52 and the OR gate 56. The output of the HLD 50 thus maintains the conductivity of the switch 58 via the OR gate 56 and the Rx 44 remains activated. The information in the XCCH slot(s) destined for the particular secondary station is coupled to the O/P 54 via the switch 52. When the information has all been received the EOT 48 detects that the transmission for that secondary station is over and applies a reset signal to the HLD 50. The OR gate 56 is thus no longer activated by the signal from the HLD 50 but only by the periodic pulses from the CNT 60.

In this manner the secondary station may activate its receiver 44 for short periods of time only when in a 'listening' mode.

If information intended for a secondary station is about to be transmitted by the primary station it will receive advance warning by means of the identifying indication signal and the ID 46 and HLD 50 activate the receiver 44 to receive the information during the following XCCH traffic slots. The receiver is powered down when all of the information has been received or by a time-out if the received signal becomes undecodeable during transmission. Apart from the CNT 60, the remainder of the circuitry need only be activated when the receiver is activated and this can conserve battery power still further. To operate correctly, the CNT 60 and the CNT 38 (FIG. 4) must be at synchronism (allowing for the propagation delay of the signals) and this can be achieved by a number of synchronisation techniques as are known in the art.

Furthermore the ID 46 may include means to delay the activation of the switch 58 and the powering-up of the Rx 44 until the particular XCCH slot in which the relevant information lies is due to be received. This information may be obtained by virtue of the position of the command signals address in the control slot or by an explicit notification as disclosed previously with reference to FIG. 3. It is possible for the traffic slot identifier XN (FIG. 3) in the indication signal to identify a traffic slot which occurs after the next MCCH slot. At busy times, for example, secondary stations can be warned well in advance of a transmission destined for them and thus subsequent control slot space can be conserved for other messages. Also, where a message is to be sent to a number of secondary stations simultaneously, many secondary stations not arranged as groups or more groups of secondary stations may need to be woken up than is possible in one MCCH slot and so extra slots can be used.

As an alternative to the structure shown in FIG. 5, the EOT 48 may be omitted and the HLD 50 may include a timing device to maintain activation of the receiver for a prearranged duration. The timing device may maintain the activation of the Rx 44 only until the next MCCH slot but in an information message continues beyond the next MCCH slot another identifying indication will have to be addressed to the secondary station.

We claim:

1. An information transmission system, comprising at least one primary station and a plurality of secondary stations, wherein said primary station comprises means for transmitting traffic information in packets during traffic time periods, and control information during control time slots interspersed among the traffic time periods, each secondary station comprises means for receiving information transmitted by the primary station, the respective means for receiving comprised in one secondary station being one receiving means, characterized in that, responsive to receipt of a plurality of traffic information to be transmitted respectively to a plurality of said secondary stations including said one secondary station, during one of said control time slots said means for transmitting (a) transmits a plurality of identifier signals respectively identifying each secondary station for which succeeding traffic information is intended, including one identifier signal identifying said one secondary station; (b) for each identifier signal transmitted, provides a respective location code, independent of characteristics of the respective identifier signal, corresponding to a respective traffic time slot within a succeeding traffic time period; and (c) during each said respective traffic time slot transmits said traffic information for the respective secondary station identified by said respective identifier signal, said one secondary station comprises means for deenergizing said one receiving means, for reenergizing said one receiving means during the control slots and then deenergizing said one receiving means, and means, responsive to reception of said one identifier signal, for again reenergizing said one receiving means during at least a part of said succeeding traffic time period.

2. A system as claimed in claim 1, characterized in that said means for transmitting transmits said plurality of traffic information in respective packets during a corresponding plurality of traffic time slots of equal length within said succeeding traffic time period.

3. A system as claimed in claim 2, characterized in that said means for transmitting transmits said respective identifier signals at respective positions in said control slot, each respective position providing said respective location code, and said means for again reenergizing reenergizes said one receiving means for the traffic time slot corresponding to the respective location code provided with said one identifier signal.

4. A system as claimed in claim 3, characterized in that said location code comprises a slot number.

5. A system as claimed in claim 3, characterized in that the position of the respective identifier signal within the control time slot is said location code.

6. A system as claimed in claim 3, wherein traffic information is transmitted over respective selected ones of a plurality of channels, characterized in that each said location code includes a channel indication.

7. A secondary station for use in an information transmission system comprising at least one primary station and a plurality of secondary stations, wherein the primary station transmits traffic information in packets during traffic time periods, and transmits control information during control time slots interspersed among the traffic time periods; said control information includes respective identifier signals at respective positions in said control slot, and a respective location code, independent of characteristics of the respective identifier signal, corresponding to a location within a succeeding traffic time period; and each identifier signal corresponds to a respective one of a plurality of said secondary stations to which traffic information is to be transmitted, and
- wherein said secondary station comprises receiving means for receiving information transmitted by the primary station,
- characterized in that said secondary station comprises means for deenergizing said receiving means, for reenergizing said receiving means during the control time slots and then deenergizing said receiving means, and
- means, responsive to reception of the respective identifier signal identifying said secondary station during said control time slots, for again reenergizing said receiving means during at least a part of said succeeding traffic time period corresponding to said location code.

8. A secondary station as claimed in claim 7, characterized in that said primary station transmits said respective identifier signals at respective positions in said control slot, the position of the respective identifier signal within the control time slot being said location code, and
- said means for again reenergizing reenergizes said one receiving means at the location within the traffic time slot corresponding to the position within the control time slot at which the identifier signal for said secondary station was transmitted.

9. A secondary station as claimed in claim 7, for use in a system wherein traffic information is transmitted over respective selected ones of a plurality of channels, characterized in that said location code includes a channel indication for succeeding traffic information, and said secondary station comprises means, responsive to receipt of said channel indication, for switching channels between receipt of said identifier signal identifying said secondary station and again reenergizing.

10. A secondary station as claimed in claim 7, for use in a system wherein said location code includes a slot number, characterized in that said means for again reenergizing during at least a part of a following traffic time period energizes during a part corresponding to said slot number.

11. A primary station for an information transmission system, for transmitting information to selected ones of a plurality of secondary stations,
- said primary station comprising means for transmitting traffic information in packets during traffic time periods, and control information during control time slots interspersed among the traffic time periods,
- characterized in that said primary station comprises means for storing a plurality of traffic information packets and a corresponding plurality of intended destinations for the respective traffic information packets,
- means for selecting at least two of said intended destinations to be said ones of said secondary stations,
- characterized in that, responsive to receipt of a plurality of traffic information to be transmitted respectively to a plurality of said secondary stations including said one secondary station, said means for transmitting (a) during a given said control time slot, transmits at least two identifier signals respectively identifying said ones of said secondary stations; (b) for each identifier signal transmitted, provides a respective location code, independent of characteristics of the respective identifier signal, corresponding to a respective traffic time slot within a succeeding traffic time period; and (c) during each said respective traffic time slot transmits said traffic information for the respective secondary station identified by said respective identifier signal.

12. A station as claimed in claim 11, characterized in that said means for transmitting transmits said information in respective packets during a plurality of traffic time slots of equal length within a traffic time period.

13. A station as claimed in claim 12, characterized in that said means for selecting determines the respective positions in said control slot in which the respective identifier signals will be transmitted.

14. A system as claimed in claim 13, characterized in that said location code comprises a slot number.

15. A system as claimed in claim 13, characterized in that the position of the respective identifier signal within the control time slot is said location code.

16. A system as claimed in claim 13, wherein traffic information is transmitted over respective selected ones of a plurality of channels, characterized in that said location code includes a channel indication for succeeding traffic information.

* * * * *